March 22, 1927.　　F. T. STEWART ET AL　　1,622,213

LIQUID SPRAYER

Filed July 21, 1925

Inventors
F. T. Stewart
W. W. Stewart

By Bryant & Lowey
Attorneys

Patented Mar. 22, 1927.

1,622,213

UNITED STATES PATENT OFFICE.

FRANK T. STEWART AND WALTER W. STEWART, OF SACRAMENTO, CALIFORNIA.

LIQUID SPRAYER.

Application filed July 21, 1925. Serial No. 45,072.

This invention relates to new and useful improvements in liquid sprayers suitable for destroying insects, or the like.

The primary object of this invention is to provide a novel form of sprayer by means of which a liquid suitable for destroying vermin or a disinfectant may be discharged in the form of a mist or in very fine particles.

Other objects and advantages of the invention will be apparent during the course of the following description.

Figure 1:
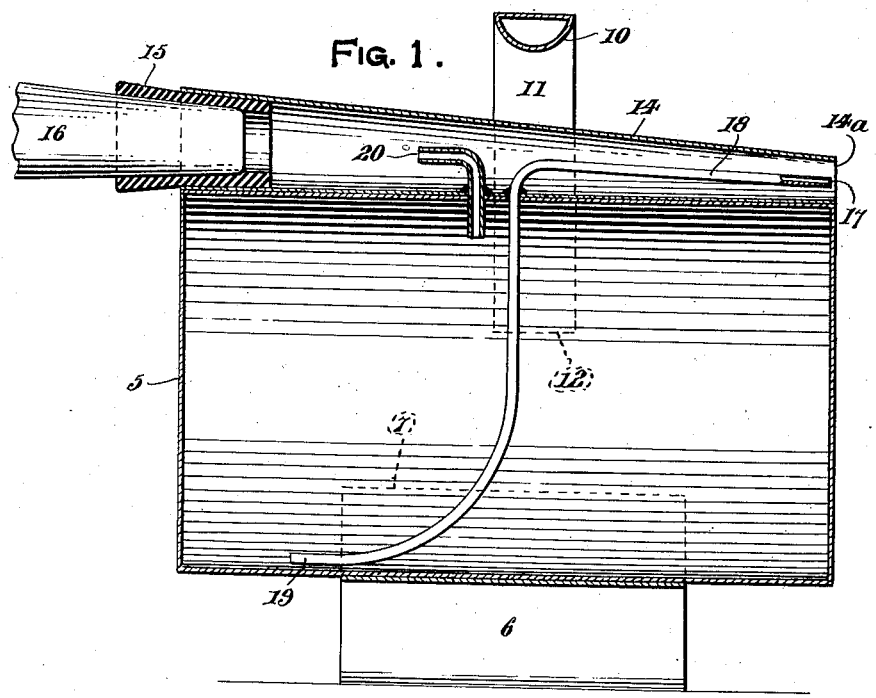
Figure 2:
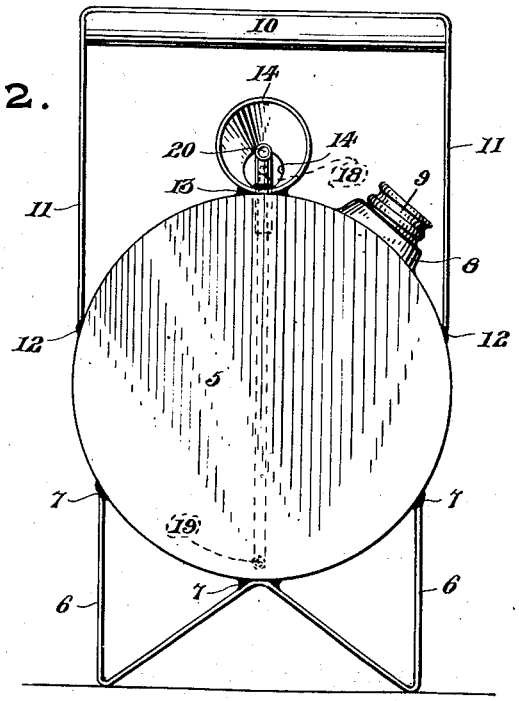

In the accompanying drawing forming a part of this specification and in which like numerals are employed to designate like parts throughout the same, Figure 1 is a vertical sectional view of the sprayer structure embodying this invention, and Figure 2 is a rear elevational view of the structure shown in Fig. 1.

In the drawing, wherein for the purpose of illustration is shown a preferred embodiment of this invention, the numeral 5 designates a body or tank which is shown as being of cylindrical formation, although it is to be understood that any suitable tank may be employed. The tank 5 is provided with a suitable stand or base 6 which is of substantially W-formation in end elevation and is soldered to the body portion of the tank 5 at the various points 7. This tank is provided with a filler opening 8 closed by a suitable threaded cap 9 which may be removed for permitting the disinfectant or vermin destroying substance to be placed within the tank. A suitable hand grip portion 10 of a handle is connected to the body portion 5 of the tank by the depending straps 1¹ which are secured to the tank by the solder 12. It is to be understood, of course, that the base or stand 6 and the handle may be secured to the tank 5 by rivets or the like if the manufacturer of the same does not desire to use solder.

Suitably secured to the upper portion of the tank 5, as by the solder 13, and arranged to extend longitudinally thereof is a conically-shaped manifold 14 which has a resilient bushing, made of rubber or the like, 15 inserted in its larger end for the purpose of permitting the discharge end 16 of a suitable power or manually operated blower, not shown, to be connected to the bore of the said manifold. The reduced or discharge end 14ª of the manifold has arranged substantially axially therein the discharge end 17 of a liquid ejecting tube 18 which extends axially through the forward half portion of the manifold and enters the interior of the tank 5 through suitable apertures formed in the manifold and the upper wall of the said tank. The lower end 19 of this ejector tube is located within the tank 5 in close proximity to its bottom wall, as best illustrated in Fig. 1. An angular injector tube 20 extends through suitable apertures formed in the adjacent walls of the manifold 14 and the tank 5 and has its inner end terminating slightly below the upper wall of the tank. The outer end of this injector tube 20 extends axially to the manifold 14 and is pointed toward the discharge end of the blower nozzle 16.

The operation of this sprayer device may be described in detail as follows:—

It is to be understood, of course, that the liquid to be sprayed is first introduced into the tank 5 through the filler opening 8. Air is then discharged into the manifold 14 through the blower nozzle 16 and this blast of air travels through the manifold and a portion of the same will enter the tank 5 through the injector tube 20 while the remainder of the blast of air will pass on through the manifold and will be discharged from the reduced end 14ª of the same. This passage of the air around the discharge end 17 of the ejector tube 18 will create a vacuum in the tube which will draw the liquid from the tank 5 and the liquid will be atomized from the discharge ends of the ejector tube 18 and the manifold 14. The entrance of air into the tank 5 by means of the injector tube 20, will, of course, create a pressure within the tank which will aid in forcing the liquid therefrom through the ejector tube 18.

It is to be understood that the form of this invention herewith shown and described is to be taken as a preferred example of the same, and that various changes in the shape, size, and arrangement of parts may be resorted to without departing from the spirit of the invention or the scope of the subjoined claim.

Having thus described the invention, we claim:—

A liquid sprayer comprising a horizontal elongated tank provided with a filling opening, a tapered tubular open-ended manifold rigidly secured directly on top of the tank and extending longitudinally of and in contiguous relation to the tank from end to end of the latter, and an ejector tube extending through the bottom of the manifold and the top of the tank with its lower end terminating within the bottom portion of the tank and its upper end portion projecting forwardly in the forward end portion of the manifold and terminating adjacent the forward smaller end of the latter, said tank comprising a horizontal cylinder, and a supporting stand embodying a substantially W-shaped strip of sheet metal arranged transversely of and rigidly secured to the bottom of the tank.

In testimony whereof we affix our signatures.

FRANK T. STEWART.
WALTER W. STEWART.